(12) United States Patent
Burkhard et al.

(10) Patent No.: US 7,345,249 B2
(45) Date of Patent: Mar. 18, 2008

(54) FORCE-TRANSMITTING MECHANISM FOR A BALANCE

(75) Inventors: Hans-Rudolph Burkhard, Wila (CH); Ernst Tschopp, Laupen (CH); Andreas Metzger, Maennedorf (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/162,918

(22) Filed: Sep. 28, 2005

(65) Prior Publication Data
US 2006/0076166 A1    Apr. 13, 2006

(30) Foreign Application Priority Data
Sep. 30, 2004    (EP)    ................... 04104813

(51) Int. Cl.
*G01G 7/02*    (2006.01)
(52) U.S. Cl. ............... 177/210 EM; 177/212; 177/229
(58) Field of Classification Search ........ 177/210 EM, 177/212, 229
See application file for complete search history.

(56) References Cited

U.S. PATENT DOCUMENTS

| | | | | |
|---|---|---|---|---|
| 5,340,951 A | * | 8/1994 | Hungerbuhler et al. | 177/229 |
| 5,641,948 A | * | 6/1997 | Burkhard | 177/229 |
| 5,771,986 A | * | 6/1998 | Kohn et al. | 177/210 EM |
| 5,866,854 A | * | 2/1999 | Emery et al. | 177/50 |
| 6,194,672 B1 | | 2/2001 | Burhard et al. | 177/210 |
| 6,232,567 B1 | | 5/2001 | Bonino et al. | 177/210 |
| 6,326,562 B1 | | 12/2001 | Burkhard et al. | 177/210 |
| 6,861,593 B2 | | 3/2005 | Kuhlmann et al. | 177/210 |

FOREIGN PATENT DOCUMENTS

| | | |
|---|---|---|
| DE | 29509829 | 11/1995 |
| DE | 29809833 | 8/1998 |
| EP | 1054242 | 11/2000 |

* cited by examiner

*Primary Examiner*—Randy W. Gibson
(74) *Attorney, Agent, or Firm*—Standley Law Group LLP

(57) ABSTRACT

In a force-transmitting mechanism (1, 101) with a parallel-guiding mechanism having a stationary (2) and a movable (4) parallelogram leg (2), with a lever mechanism having at least one lever (6), and with at least one coupling element (5, 105) that introduces a force into the lever mechanism or transfers the force within the lever mechanism, wherein the coupling element is stiff in its lengthwise direction but bends elastically. The coupling element has at least one first flexure joint (8) with a thin material connection and it is movable in the parallelogram plane. The lever mechanism and each coupling element (5, 105) are integral parts of a material block. Each coupling element (5, 105) also has at least two second flexure joints (16, 116) with thin material connections whose flexibility is in the direction transverse to the bending of the first flexure joint (8).

20 Claims, 2 Drawing Sheets

FORCE-TRANSMITTING MECHANISM FOR A BALANCE

TECHNICAL FIELD

The invention relates to a force-transmitting mechanism for a force-measuring device, in particular for a balance, with a parallel-guiding mechanism comprising a stationary and a movable parallelogram leg, with a lever mechanism comprising at least one lever, and with at least one coupling element that serves to introduce a force into the lever mechanism or to transfer the force within the lever mechanism.

BACKGROUND OF THE ART

A force-transmitting mechanism is often used in force-measuring devices, in particular balances of the type in which the principle of electromagnetic force compensation is employed to convert a force originating from a load on a weighing pan into an electrical signal. The force-transmitting mechanism has the purpose to reduce the weight force caused by the applied load, for example in a balance, to such an extent that the resultant reduced force can be converted to a measuring signal whose magnitude is matched to the available load range of a force-measuring device. It is a known fact that in this kind of a force-measuring device based on the principle of electromagnetic force compensation, the displacement of the levers and, accordingly, the deflection of the associated flexure joints are very small.

A force-measuring device of the foregoing description has a parallel-guiding linkage with a stationary portion formed by one parallelogram leg on which a vertically displaceable parallelogram leg is constrained by way of two parallelogram guide members. The force-measuring device further comprises a lever mechanism that is coupled to the parallelogram linkage through a coupling element that is stiff in the lengthwise direction but bends elastically, serving to introduce the force from the parallelogram linkage into the lever mechanism. The force-reducing lever mechanism comprises at least one lever and is supported on the stationary part of the parallelogram linkage. A coupling element is predominantly—but not necessarily—delimited at both ends by a flexure joint consisting of a thin material connection and defining a point of force application. If the lever mechanism has a plurality of levers, the lever arms of levers that follow each other in the lever chain are connected to each other by coupling elements and supported either on the stationary part of the parallelogram or on a preceding lever by a flexure fulcrum comprising a thin material connection.

Every point of a movable part of the parallel-guiding mechanism moves essentially in a plane, a so-called parallelogram plane. The term "the parallelogram plane" as used hereinafter always represents any of the planes in which the points of a parallelogram linkage move.

In U.S. Pat. No. 5,340,951, a commonly-owned patent in which the present inventor is a co-inventor, a force-measuring device of this type is described with a force-transmitting mechanism wherein the lever mechanism has at least one reduction lever being supported on a stationary part, wherein the at least one coupling element is stiff in the lengthwise direction but bends elastically, and wherein the lever mechanism and the at least one coupling element are made of a monolithic material block in which material-free areas are formed. The material-free areas are designed as thin linear cuts separating portions of the material block. The thin linear cuts, which are preferably produced by means of spark erosion, run through the material block perpendicular to the parallelogram plane. The material portion that forms the at least one lever is connected to the material portion that forms the stationary part through a thin flexure joint that forms a lever fulcrum, and it is connected to the coupling element through a locally confined juncture where the force is introduced into the lever.

A weighing transducer based on the principle of electromagnetic force compensation is disclosed in EP 1 054 242 A1, wherein the essential parts, i.e., the parallelogram linkage, the lever mechanism, the coupling elements and the fulcrums, are formed out of a single material block, with a housing-mounted base portion of the material block extending into the space between the two parallelogram guide members and forming a fulcrum support for a first lever. At least one lever is divided at least partially into two levers and at least one coupling element is divided into two coupling element parts that are arranged symmetrically on both sides of a cantilevered part of the housing-mounted base portion.

The shaping of the individual portions of the force-transmitting mechanism out of a single material block can be accomplished either by milling or through an erosion process. It is also conceivable to produce an at least partially monolithic force-transmitting mechanism of this kind through a casting process or an extrusion process.

As already disclosed in U.S. Pat. No. 5,340,951, the coupling element connecting the movable parallelogram leg to the first lever of the lever mechanism has grooves that are cut from both sides perpendicular to the parallelogram plane and are arranged in the mid-portion between the flexure joints of the coupling element, whereby the material thickness of the coupling element is reduced in the area of the grooves. Due to the resultant flexibility of the coupling element in the direction transverse to the parallelogram plane, a possible slight twisting of the movable parallelogram leg which may arise from an off-centered introduction of the force to be measured can be absorbed by the coupling element so that the effect of the twisting transmitted to the lever mechanism and to a connected measuring transducer is reduced.

According to U.S. Pat. No. 5,641,948, a commonly-owned patent in which the present inventor is the inventor, the effect that an off-centered measuring force has on the parallel-guiding mechanism can be suppressed even more strongly through a design in which the area of transverse flexibility of the coupling element is spatially correlated to the axis of the transverse twisting of the parallel-guiding mechanism under a laterally off-centered load, in particular through an arrangement where the portion of the coupling element that flexes transversely to the parallelogram plane is made to coincide with the rotary axis of the transverse twisting of the movable parallelogram leg which occurs under an eccentric load.

The measures described above for suppressing the introduction of lateral forces into the force-transmitting mechanism, which can occur when the force-transmitting mechanism is used in a balance and the weighing load is placed off center, have the disadvantage that a total suppression cannot be achieved in high-resolution force-measuring devices and that transverse forces—even though they are small—are transmitted from the coupling element to the lever system, with the result that a so-called corner-load error can be observed in the measuring result.

Consequently, there is a need for an improved suppression of these forces that are introduced laterally into a force-transmitting mechanism, in particular if the force-transmitting mechanism is used in a high-resolution balance.

SUMMARY OF THE INVENTION

A solution to this task is offered by the features according to the appended claims. In a force-transmitting mechanism with a parallel-guiding mechanism comprising a stationary and a movable parallelogram leg, with a lever mechanism comprising at least one lever, and with at least one coupling element that serves to introduce a force into the lever mechanism or to transfer the force within the lever mechanism, wherein the coupling element is stiff in its lengthwise direction but bends elastically, comprising at least a first flexure joint that has a thin material connection and is movable in the plane of the parallelogram, the lever mechanism and the at least one coupling element are integral parts of a material block. The at least one coupling element comprises at least two second flexure joints having thin material connections whose flexibility is in the direction transverse to the bending of the first flexure joint.

The foregoing concept brings an improvement over the state of the art in the uncoupling of the lever mechanism from the movable parallelogram leg in regard to the occurrence of transverse forces. To a large extent, the uncoupling effect is independent of the load acting on the force-transmitting mechanism. This is a result of using at least two second flexure joints and thereby locally confining the bending elasticity of the coupling element transverse to the deflection of the at least one first flexure joint.

With preference, each of the second flexure joints is formed by two grooves located opposite each other, extending lengthwise in the parallelogram plane and delimiting between each other a thin material connection.

In a preferred embodiment of the force-transmitting mechanism, the at least one coupling element comprises two first flexure joints through which one end of the coupling element connects to the movable parallelogram leg and the other end connects to the first lever of the lever mechanism, with the second flexure joints being arranged between the first flexure joints in a mid-portion of the coupling element.

In an advantageous embodiment, the lengths of the aforementioned grooves are oriented at a right angle to the lengthwise dimension of the mid-portion of the coupling element.

The second flexure joints may be specifically shaped either by drilling bore holes from the narrow lateral surface of the substantially brick-shaped material block, or by cutting grooves which are produced by removing material locally from the material block, in particular by milling.

In advantageous embodiments, the second flexure joints can have a profile that is shaped like a part of a circle or has a triangular, pentagonal or rectangular shape.

In a particularly advantageous embodiment where the material block may be substantially brick-shaped, lateral recesses extending over the area of the entire coupling element and entering from both of the block surfaces that are oriented in or, respectively, parallel to the parallelogram plane reduce the material cross-section of the coupling element. Within this coupling element, the second flexure joints are formed by grooves in the recessed lateral surface areas.

With preference, the force-transmitting mechanism is configured symmetrically in relation to a median parallelogram plane.

In another embodiment of the force-transmitting mechanism, the parallelogram linkage may likewise be an integral part of the material block.

BRIEF DESCRIPTION OF THE DRAWINGS

Preferred embodiments and configurations of the force-transmitting mechanism according to the invention and also of the coupling elements are represented schematically in the drawings and will be described hereinafter in detail with references to the drawing figures, wherein.

DETAILED DESCRIPTION OF A PREFERRED EMBODIMENT

Figure 1:
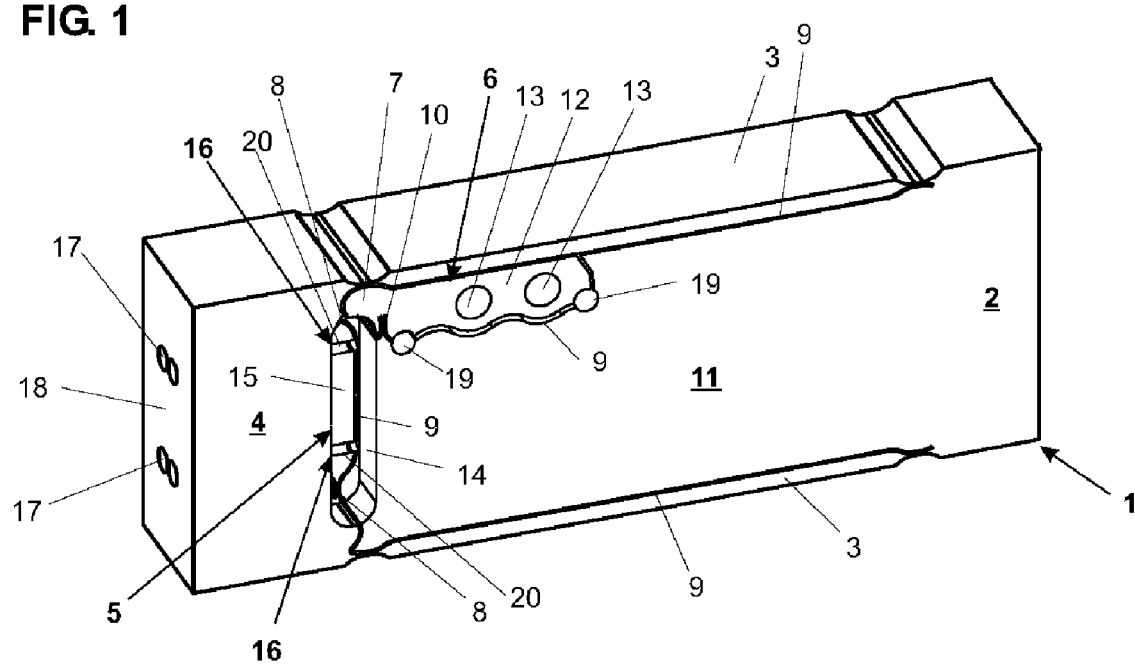
FIG. 1 represents a force-transmitting mechanism with a coupling element in a first embodiment shown in a three-dimensional representation.

FIG. 1 gives a perspective view of a force-transmitting mechanism 1 for a force-measuring device in a balance, wherein the force-transmitting mechanism 1 is made in one piece out of a substantially brick-shaped material block. The force-transmitting mechanism 1 has a parallel-guiding mechanism with a stationary parallelogram leg 2 on which a movable parallelogram leg 4 is constrained by way of two parallelogram guide members 3. The movable parallelogram leg 4 is connected to a weighing pan that is not shown in the drawing. When a load is placed on the weighing pan, the movable parallelogram leg 4 is vertically displaced in the direction of gravity in relation to the stationary parallelogram leg 2. The force-transmitting mechanism 1 has a coupling element 5 through which a force acting on the movable parallelogram leg 4 is transmitted to a lever mechanism. In the force-transmitting mechanism 1 shown in the drawing, the lever mechanism has only one force-reducing lever 6 whose shorter lever arm 7 is connected to the coupling element 5 by means of a first flexure joint 8. Through a further first flexure joint 8, the coupling element 5 is connected to the movable parallelogram leg 4. Thus, when the movable parallelogram leg 4 is moved in the direction of gravity, this has the effect that a tractive force is applied through the coupling element 5 to the short lever arm 7 of the lever 6 which is supported through a thin flexure fulcrum 10 on a cantilever 11 of the stationary parallelogram leg 2, whereby the long lever arm 12 of the lever 6 is moved in the opposite direction. The parallel-guiding linkage, the coupling element 5 and the lever 6 are formed in the substantially brick-shaped material block in such a way that the material portions of the block are separated from each other by material-free spaces constituted by thin linear cuts 9 which traverse the material block perpendicular to its largest surface which lies in the plane of the parallelogram. The linear cuts 9 are preferably produced by means of a spark-erosion process, where the holes 19 serve to insert the erosion wire. The illustrated force-transmitting mechanism 1 is symmetrical in relation to a symmetry plane which extends as a median plane of the material block, parallel to the largest surfaces of the block.

The lever arm 12 is provided with passage holes 13 for screw bolts that serve to attach a lever extension (not shown in the drawing) which can, in turn, be connected to a measuring transducer which is likewise not shown in the drawing. The measuring transducer may have an immersion coil that is arranged in the field gap of a permanent magnet. In other words, the force measuring device is of the kind that operates according to the principle of electromagnetic force compensation. However, it is also possible to use other measuring transducers that have only a small amount of deflection under a load, for example string oscillators.

The mid-portion 15 of the coupling element 5 comprises grooves 20 from both sides near the first flexure joints 8. The grooves 20 form second flexure joints 16 in the upper and lower areas of the coupling element 5. The pivotal axes of the flexure joints 16 lie in the parallelogram plane, i.e., the flexure joints 16 provide the coupling element 5 with mobility transverse to the plane of the parallelogram. The grooves 20 are produced by precisely placed bore holes 17 entering the material block from the narrow lateral surface 18 of the movable parallelogram leg 4. In addition, the coupling element 5 comprises recessed lateral surfaces 14 over its entire length, so that the material thickness of the coupling element 5 is reduced in the direction transverse to the parallelogram plane. As a consequence, the bore holes 17 will fall partially outside of the material envelope of the coupling element 5 in the areas of the recessed surfaces 14, whereby the grooves 20 are formed which by virtue of the arrangement in pairs delimit the flexure joints 16. Outside of the grooves 20, the material cross-section of the coupling element 5 is still large enough so that an unwanted load-dependent deformation of the mid-portion 15 of the coupling element 5 is largely avoided.

The bore holes 17, which are arranged in the parallelogram plane, running in pairs near the upper and lower first flexure joints 8, have such a small separation from one hole in a pair to the other that a flexure joint 16 is formed with a minimum material thickness between about 50 and 1000 µm. The specific dimension for the smallest thickness in a flexure joint 16 depends on the specified load capacity range of the force-measuring device that contains the force-transmitting mechanism 1.

Figure 2:
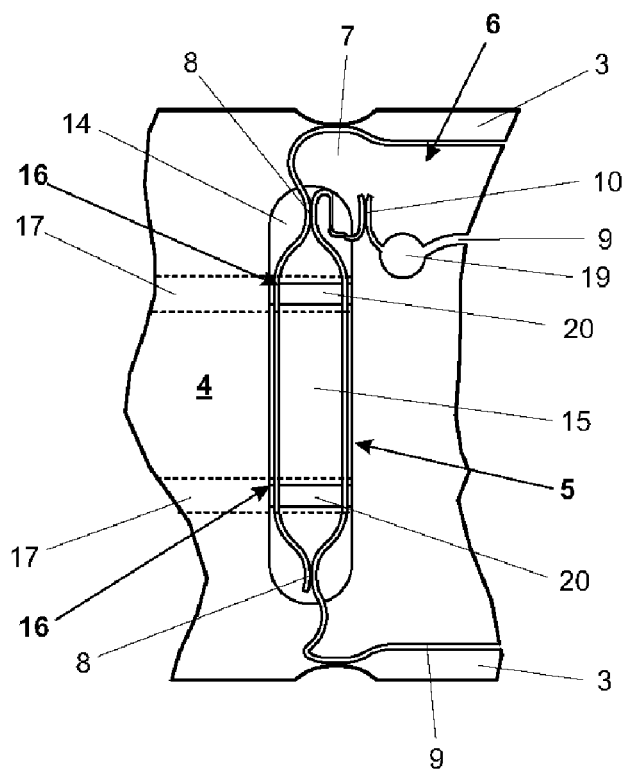
FIG. 2 represents a strongly enlarged view of a coupling element of the force-transmitting mechanism of FIG. 1, wherein the view is directed at one of the large surfaces extending in the parallelogram plane of the force-transmitting mechanism.

FIG. 2 shows an enlarged detail view of the area of the coupling element 5 of the force-transmitting mechanism 1 of FIG. 1, as seen from the side. Indicated by broken lines are the bore holes 17 that continue into the grooves 20 which form the second flexure joints 16. The material width of the force-transmitting mechanism 1 is reduced by means of recessed lateral surfaces 14 in the entire area of the coupling element 5, with a further locally concentrated reduction of the material thickness occurring at the second flexure joints 16. As a result, the coupling element 5 is given the flexibility to bend in the direction transverse to the parallelogram plane, so that a possible lateral twisting of the movable parallelogram leg 4 is not transmitted through the coupling element 5 into the lever 6. The lever 6 shares the full material width of the material block transverse to the parallelogram plane, which makes the lever 6 and in particular its flexure fulcrum 10 insensitive to transverse twisting. Thus, a coupling element 5 with two second flexure joints 16 in combination with a lever 6 that is supported over its entire width leads to a further improvement in preventing transverse forces from entering into the lever mechanism and propagating from there into a measuring transducer system arranged at the end of the lever mechanism.

Figure 3:
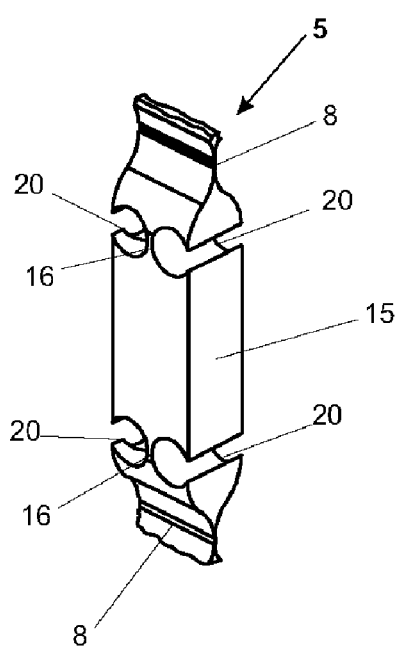
FIG. 3 represents a coupling element shown by itself in the embodiment according to FIG. 1, shown in three-dimensional representation.

FIG. 3 gives a perspective detail view of a coupling element 5 of a force-transmitting mechanism 1 which has been separated from the material block mostly along the thin linear cuts 9. The spatial orientation of the first flexure joints 8 in relation to the second flexure joints 16 can be seen with particular clarity in this illustration. Preferably, the distance from each first flexure joint 8 to the nearest second flexure joint 16 is optimized in regard to the stress distribution in the material of the coupling element 5.

The pivotal axes of the first flexure joints 8 run transverse to the parallelogram plane, while the pivotal axes of the second flexure joints 16 are preferably located in a median parallelogram plane, i.e., the symmetry plane of the force-transmitting mechanism 1. The line of intersection of the respective planes of the first and second flexure joints is preferably parallel to the lengthwise dimension of the coupling element 5 and runs inside the material-filled space of the coupling element 5. In the embodiment shown in FIG. 3, the distance of the upper second flexure joint 16 from the upper first flexure joint 8 is equal to the distance of the lower second flexure joint 16 from the lower first flexure joint 8.

Figure 4:
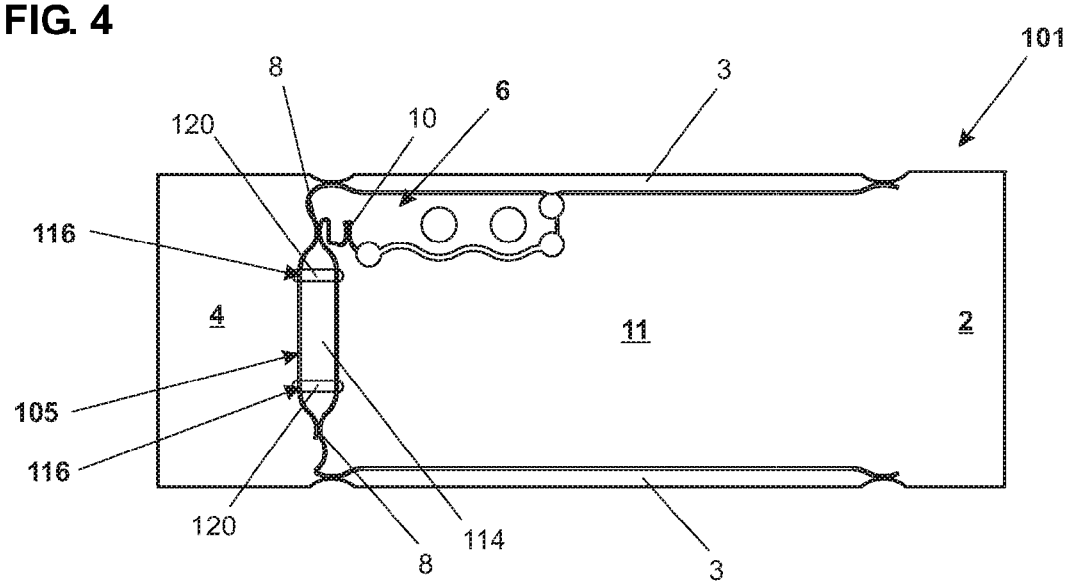
FIG. 4 represents a force-transmitting mechanism in a second embodiment, wherein the view is directed at one of the large surfaces extending in the parallelogram plane of the force-transmitting mechanism.
Figure 5:
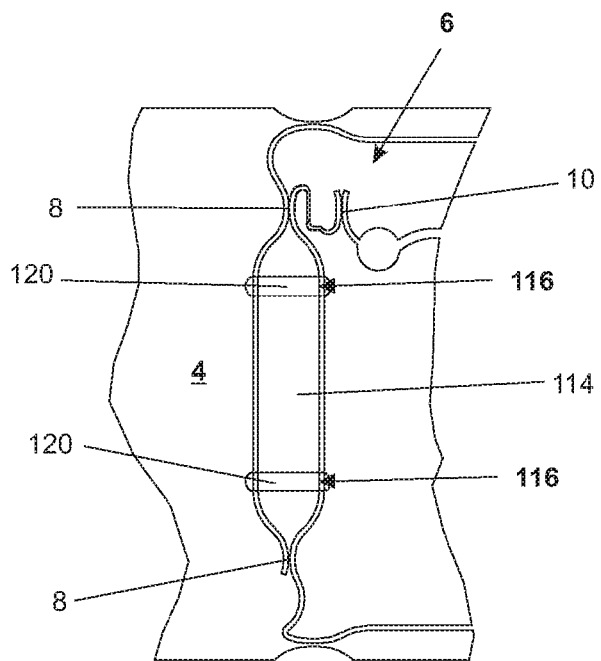
FIG. 5 represents a strongly enlarged view of the coupling element of the force-transmitting mechanism of FIG. 4.

A further embodiment of a force-transmitting mechanism 101 is illustrated in FIGS. 4 and 5, with FIG. 4 showing the entire force-transmitting mechanism 101 and FIG. 5 representing an enlarged detail view of the portion that contains the coupling element 105. Elements that are identical to those in FIGS. 1 and 2 have been given the same reference symbols and are not described again in the context of FIGS. 4 and 5. The force-transmitting mechanism 101 does not have recessed lateral surfaces in the area of the coupling element 105. The second flexure joints 116, which are again formed by grooves 120 extending in the lengthwise direction of the parallelogram plane, are formed by removing material from the material block in a limited local area, for example by milling. In order to make the second flexure joints 116 as thin as possible, one may prefer to give the grooves 120 a larger width than those shown in FIGS. 1 and 2. An embodiment of the coupling element 105 in accordance with FIGS. 4 and 5 recommends itself in particular for narrow force-transmitting mechanisms 101.

Of course, a force-transmitting mechanism 101 of the type shown in FIGS. 4 and 5, in which the second flexure joints 116 are produced by milling in the mid-portion 115 of the coupling element 105, can likewise be provided with a recessed lateral surface extending over the entire area of the coupling element 105.

Figure 6A:
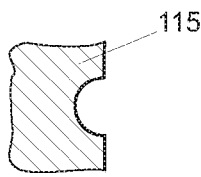
FIGS. 6a to 6d show different configurations of the grooves in a cross-sectional representation of a strongly enlarged section of the coupling element.
Figure 6B:
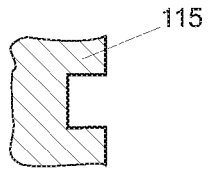
Figure 6C:
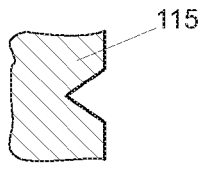
Figure 6D:
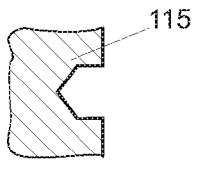

FIGS. 6a to 6d illustrate the grooves 20, 120 in different embodiments in a sectional view of a portion of a coupling element 5, 105, in a sectional plane that is perpendicular to the lengthwise dimension of the respective groove. Depending on the method selected for making the grooves 20, 120, whether they are produced by means of drilling holes from the narrow lateral surface 18 of the material block or by milling or sink erosion, the profile of the groove can be in the shape of a part of a circle (FIG. 6a), a rectangle (FIG. 6b), a triangle (FIG. 6c), or a pentagon (FIG. 6d). The shapes according to FIGS. 6c and 6d are particularly advantageous for flexure joints 16, 116 of minimal material thickness and precise definition of the pivotal axis.

The force-transmitting mechanism 1, 101 according to the invention has been described and illustrated in preferred embodiments. However, those skilled in the pertinent art will be able to realize further embodiments by applying the teachings of the invention. In particular, a coupling element with first flexure joints 8 and second flexure joints 16, 116 can also be used in a force-transmitting system that has a lever mechanism with two or three levers as described, e.g., in U.S. Pat. No. 5,340,951, which is cited above. Furthermore, the addition of second flexure joints 16, 116 is in the latter case not limited to the coupling element 5, 105 that connects the movable parallelogram leg 4 with the short lever arm of the first lever. Coupling elements that connect the subsequent levers of the mechanism can be configured in an analogous manner as the coupling element 5, 105.

If the balance has a built-in calibration device where the calibration weight is applied for example on an additional lever arm or on an additional parallel-guiding mechanism and where the force of the built-in calibration weight is coupled to the lever mechanism of the force-transmitting mechanism by means of a coupling element, the latter can conceivably be provided with at least two second flexure joints. These second flexure joints can be of an analogous embodiment as those illustrated in FIGS. 1 to 6.

Further embodiments of a coupling element in which there are more than two second flexure joints are not to be excluded from the scope of the present invention.

As mentioned already in the context of FIG. 1, the force-transmitting mechanism, i.e., the parallel-guiding mechanism, the coupling element and the lever mechanism are integral parts of a material block. There are also embodiments, as described for example in U.S. Pat. No. 5,340,951, as cited above, in which only the at least one coupling element and the lever mechanism are integral parts of a material block that can be installed in a parallel-guiding system.

What is claimed is:

1. A mechanism for transmitting force in a device for measuring force, in particular for a balance, comprising:
    a parallel-guiding mechanism comprising a stationary parallelogram leg, a movable parallelogram leg and a pair of parallel-guide members that constrain every movable part of the parallel-guiding mechanism to movement in one of a plurality of parallel planes;
    a lever mechanism comprising at least one lever; and
    at least one coupling element for introducing the force into the lever mechanism or for transferring the force therein, each coupling element being stiff in a lengthwise direction thereof but elastically bendable, each coupling element comprising at least one first flexure joint and at least two second flexure joints, each first and second flexure joint having a thin material connection and a pivot axis, each first flexure joint pivot axis being transverse to the plurality of parallel planes and each second flexure joint pivot axis being parallel to the plurality of parallel planes, the second flexure joints being respectively located in an upper and a lower portion of the coupling element to provide the coupling element with mobility transverse to the plurality of parallel planes;
    wherein the lever mechanism and the at least one coupling element are integrally formed from a block of material.

2. The force-transmitting mechanism of claim 1, wherein:
    each of the second flexure joints is formed by two grooves, located opposite each other and extending lengthwise in the parallelogram direction to delimit therebetween the thin material connection.

3. The force-transmitting mechanism of claim 2, wherein:
    each coupling element comprises two first flexure joints, one of which connects a first end of the coupling element to the movable parallelogram leg and the other of which connects a second end to the first lever, with the second flexure joints being arranged between the first flexure joints on the coupling element.

4. The force-transmitting mechanism of claim 1, wherein:
    each coupling element comprises two first flexure joints, one of which connects a first end of the coupling element to the movable parallelogram leg and the other of which connects a second end to the first lever, with the second flexure joints being arranged between the first flexure joints on the coupling element.

5. The force-transmitting mechanism of claim 3, wherein:
    the grooves extend lengthwise in a direction that is perpendicular to the lengthwise dimension of the coupling element mid-portion.

6. The force-transmitting mechanism of claim 5, wherein:
    the material block is substantially brick-shaped with a pair of largest surfaces thereof in the plane of the parallelogram and a pair of narrow end surfaces; and
    the grooves are formed by drilling bore holes into one of the narrow end surfaces.

7. The force-transmitting mechanism of claim 1, wherein:
    the material block is substantially brick-shaped with a pair of largest surfaces thereof in the plane of the parallelogram and a pair of narrow end surfaces; and
    the grooves are formed by drilling bore holes into one of the narrow end surfaces.

8. The force-transmitting mechanism of claim 5, wherein:
    the grooves are produced by locally removing material from the material block, using a process such as milling or sink erosion.

9. The force-transmitting mechanism of claim 1, wherein:
    the grooves are produced by locally removing material from the material block, using a process such as milling or sink erosion.

10. The force-transmitting mechanism of claim 6, wherein:
    a cross-sectional profile of the grooves is selected from a group consisting of: a triangle, a rectangle, a pentagon, and a part of a circle.

11. The force-transmitting mechanism of claim 8, wherein:
    a cross-sectional profile of the grooves is selected from a group consisting of: a triangle, a rectangle, a pentagon, and a part of a circle.

12. The force-transmitting mechanism of claim 3, wherein:
    a line of intersection of the respective planes of the first and second flexure joints is parallel to the lengthwise dimension of the coupling element and runs inside a material-filled space of the coupling element.

13. The force-transmitting mechanism of claim 1, wherein:
    a line of intersection of the respective planes of the first and second flexure joints is parallel to the lengthwise dimension of the coupling element and runs inside a material-filled space of the coupling element.

14. The force-transmitting mechanism of claim 12, wherein:
    a distance from the first of the second flexure joints to the first of the first flexure joints is equal to a distance from the second of the second flexure joints to the second of the first flexure joints.

15. The force-transmitting mechanism of claim 13, wherein:
    a distance from the first of the second flexure joints to the first of the first flexure joints is equal to a distance from the second of the second flexure joints to the second of the first flexure joints.

16. The force-transmitting mechanism of claim 6, wherein:
the material width of the coupling element is reduced by laterally recessed surface areas entering from both of the sides of the material block that are parallel to the plurality of parallel planes, the second flexure joints being are formed by grooves within the laterally recessed surface areas.

17. The force-transmitting mechanism of claim 7, wherein:
the material width of the coupling element is reduced by laterally recessed surface areas entering from both of the sides of the material block that are parallel to the plurality of parallel planes, the second flexure joints being are formed by grooves within the laterally recessed surface areas.

18. The force-transmitting mechanism of claim 1, wherein:
the force-transmitting mechanism is configured symmetrically relative to a median parallelogram plane.

19. A device for measuring force, comprising:
a force-measuring mechanism according to claim 1.

20. A balance, comprising:
a force-measuring mechanism according to claim 1.

* * * * *